(12) United States Patent
Sundararajan et al.

(10) Patent No.: US 12,483,619 B2
(45) Date of Patent: Nov. 25, 2025

(54) SCALABLE CREATION OF CONNECTIONS

(71) Applicant: Cisco Technology, Inc., San Jose, CA (US)

(72) Inventors: Balaji Sundararajan, Fremont, CA (US); Kiran Desai, Santa Clara, CA (US); Biju Mathews Mammen, Mountain House, CA (US); Basavaraju Halappa, San Jose, CA (US); Zaheer Aziz, Murphy, TX (US)

(73) Assignee: Cisco Technology, Inc., San Jose, CA (US)

( * ) Notice: Subject to any disclaimer, the term of this patent is extended or adjusted under 35 U.S.C. 154(b) by 310 days.

(21) Appl. No.: 18/062,504

(22) Filed: Dec. 6, 2022

(65) Prior Publication Data

US 2024/0056498 A1 Feb. 15, 2024

Related U.S. Application Data

(60) Provisional application No. 63/397,110, filed on Aug. 11, 2022.

(51) Int. Cl.
*G06F 15/173* (2006.01)
*H04L 9/40* (2022.01)
*H04L 45/74* (2022.01)
*H04L 45/7453* (2022.01)
*H04L 67/1095* (2022.01)

(52) U.S. Cl.
CPC ........ *H04L 67/1095* (2013.01); *H04L 45/742* (2013.01); *H04L 45/7453* (2013.01); *H04L 63/0823* (2013.01)

(58) Field of Classification Search
CPC .............. H04L 67/1095; H04L 45/742; H04L 45/7453; H04L 63/0823
See application file for complete search history.

(56) References Cited

U.S. PATENT DOCUMENTS

2016/0226967 A1* 8/2016 Zhang ................. H04L 67/1038
2017/0126565 A1* 5/2017 Wang .................... H04L 12/465
(Continued)

FOREIGN PATENT DOCUMENTS

AU 2016277754 B2 2/2018
WO WO2017063537 A1 4/2017

OTHER PUBLICATIONS

Cisco, "Chapter: Cisco SD-WAN Overlay Network Bring-Up Process," published Apr. 25, 2019, updated Nov. 23, 2022, 110 pages.
(Continued)

*Primary Examiner* — Duyen M Doan
(74) *Attorney, Agent, or Firm* — Lee & Hayes, P.C.

(57) ABSTRACT

A method of creating a connection between a controller and plurality of edge devices may include reading, by a data plane development kit (DPDK) of the controller, a plurality of packets having a common destination port from the plurality of edge devices, and demuxing, by the DPDK, a number of frames of the plurality of packets based on a hash of the plurality of packets, the hash altering the common destination port of the plurality of packets with a corresponding number of sham destination ports. The method may also include, with a TUNTAP interface, injecting the plurality of packets into a network kernel, and with the network kernel, delivering the plurality of packets to a respective one of a plurality of daemon instances.

20 Claims, 7 Drawing Sheets

(56) References Cited

U.S. PATENT DOCUMENTS

| | | | |
|---|---|---|---|
| 2018/0329743 A1 | 11/2018 | Pope et al. | |
| 2018/0376516 A1 | 12/2018 | Bandlamudi | |
| 2019/0207776 A1 | 7/2019 | Wang et al. | |
| 2020/0374238 A1* | 11/2020 | Momchilov | H04L 47/781 |
| 2022/0109693 A1 | 4/2022 | Mashargah et al. | |
| 2023/0066013 A1* | 3/2023 | Ball | G06F 21/606 |
| 2023/0412526 A1* | 12/2023 | Nallamothu | H04L 45/50 |

OTHER PUBLICATIONS

Kiran K.N., et al., "Day One: Contrail DPDK vRouter", Juniper Networks, Jan. 1, 2021, 196 Pages, XP093090925, Retrieved from https://www.juniper.net/documentation/en_US/day-one-books/contrail-DPDK.pdf on Oct. 12, 2023, p. 42-p. 123, p. 170-p. 193.

International Search Report and Written Opinion for International Application No. PCT/US2023/029620, mailed Nov. 28, 2023, 9 Pages.

Verizon: "Verizon Network Infrastructure Planning SDN-NFV Reference Architecture", Version 1.0, Feb. 2016, XP055695763, Retrieved from https://m.iotone.com/files/pdf/vendor/Verizon_SDN-NFV_Reference_Architecture.pdf on May 15, 2020, p. 14-p. 34, p. 159-p. 169, 220 pages.

\* cited by examiner

SCALABLE CREATION OF CONNECTIONS

RELATED APPLICATION

This application claims priority to U.S. Provisional Application Ser. No. 63/397,110, filed Aug. 11, 2022, the disclosures of which are incorporated by reference herein.

TECHNICAL FIELD

The present disclosure relates generally to computer networking. Specifically, the present disclosure relates to systems and methods for scalable creation of connections between a controller and plurality of edge devices.

BACKGROUND

A computer network is a geographically distributed collection of nodes interconnected by communication links and segments for transporting data between hosts, such as personal computers and workstations. Many types of networks are available, with the types ranging from local area networks (LANs) and wide area networks (WANs) to overlay networks and software-defined networks (SDNs). Connections between edge nodes such as switches or routers may be controlled and initiated by controllers within the network. An orchestrator device may learn about the controllers in, for example, an overlay network by virtue of a number of live control connection sessions.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
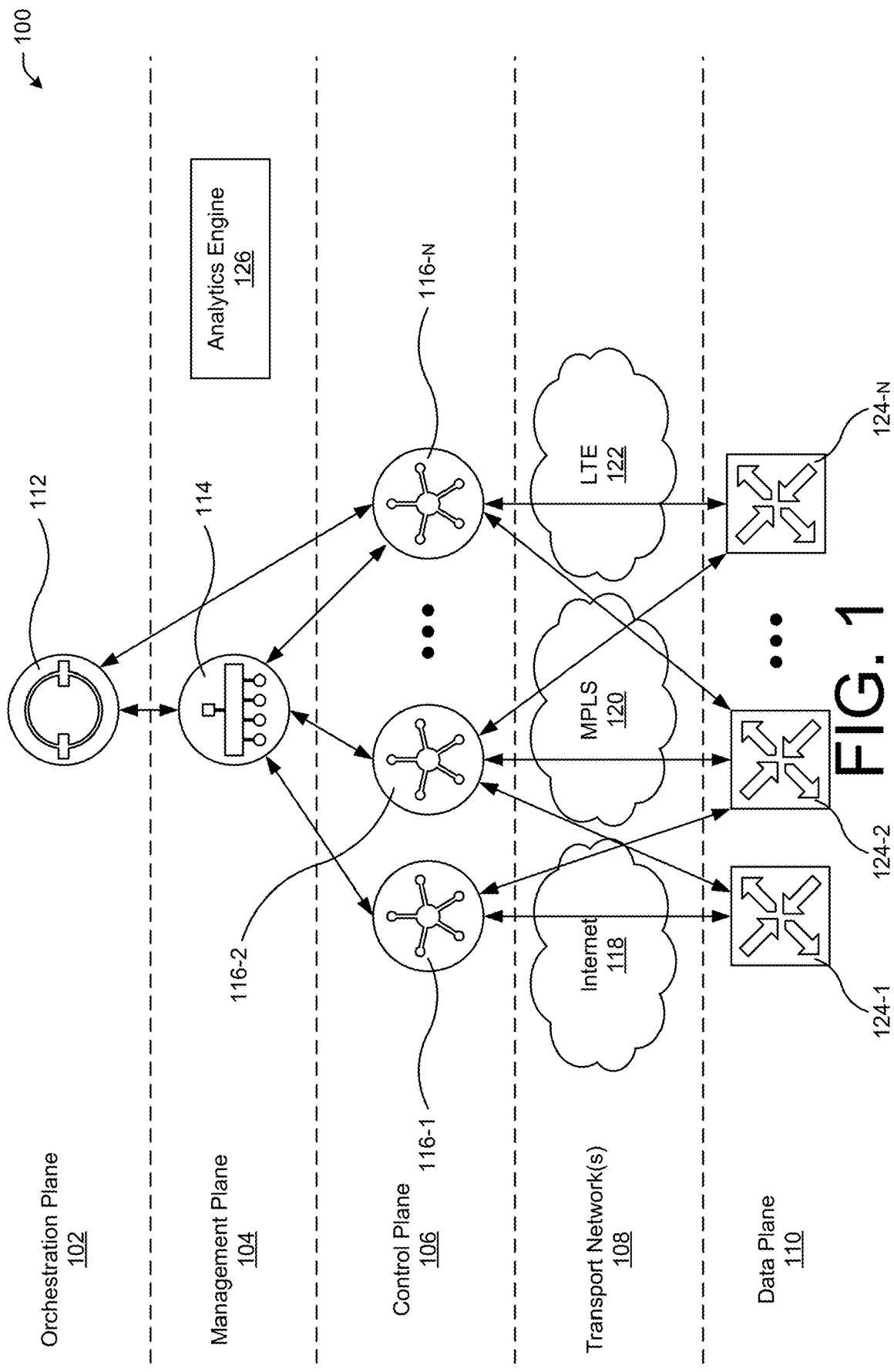
FIG. 1 illustrates a system-architecture diagram of a network environment, according to an example of the principles described herein.

A method of creating a connection between a controller and plurality of edge devices may include reading, by a data plane development kit (DPDK) of the controller, a plurality of packets having a common destination port from the plurality of edge devices, and demuxing, by the DPDK, a number of frames of the plurality of packets based on a hash of the plurality of packets, the hash altering the common destination port of the plurality of packets with a corresponding number of sham destination ports. The method may also include, with a TUNTAP interface, injecting the plurality of packets into a network kernel, and with the network kernel, delivering the plurality of packets to a respective one of a plurality of daemon instances.

Example Embodiments

In some overlay networks, information regarding a controller entry may be synced from a hosted daemon instance to other daemon instances. On a multi-instanced daemon orchestrator device, it may not matter which daemon instance hosts the connection (e.g., a datagram transport layer security (DTLS) connection) for the controller. However, the orchestrator may require a synchronization mechanism in order to ensure that the controller databases (DBs) of the edge devices are alike across all daemon instances. This may allow for load-balancing and/or filtering strategies to be applied for the sake of connectivity into the controllers and may yield identical results regardless of the daemon instance into which the edge device connects. Due to this synchronization mechanism, the "register reply" mechanism embedded in the daemon-to-daemon communication channel between the orchestrator and the edge device may function alike at all the daemon instances. Register reply is a proprietary type-length-value or tag-length-value (TLV)-based message sent from the orchestrator to the edge devices wherein the reply message from the orchestrator contains all the candidate controller information the edge device may select in order to connect. TLV is an encoding scheme used for optional informational elements in a certain protocol. A TLV-encoded data stream may include code related to the record type, the record value's length, and the value itself.

Among a number of issues to be solved for a scaled orchestrator architecture, three issues are addressed and overcome by the present systems and methods. First, as the external world is not aware (rather need not be aware) of the multiple instance of the daemon that hosts the DTLS control connections at the orchestrator, int may be unclear how a singular DTLS port (e.g., a sham port) get divvied or divided across each daemon instance. Stated another way, it may be beneficial to understand what percentage of the inbound control connections each of the daemon instances may host. It may be beneficial to maintain the sham perception of a single DTLS connection to the external world. Further, it may be beneficial to have no configuration or software changes at controller entities within the network.

A second issue may include providing a low overhead manner in which to allow controller peering information to be synchronized from one daemon instance to another daemon instance.

A third issue may include, at an orchestrator such as a multi-instanced and/or scaled or non-scaled orchestrator and in some use-cases, when a register request arrives from an edge device, the register request may be required to be relayed immediately onto a network manager and/or a network controller prior to responding with the register reply message back to the edge device. The register reply message, which may otherwise have been turned around immediately, may be kept pending until a response from the network manager and/or the network controller arrives. The response from the network manager and/or the network controller may dictate further decisions as to how the edge device may join the overlay network. In some examples as to how the edge device may join the overlay network may include (1) transmitting a certificate signing request (CSR) from an edge device to obtain a signed certificate (2) performing an embargo IP check, and (3) utilizing network address translation (NAT) hole-punch messages. With the multi-instance implementation, it may be unclear how to handle the messages that require transit from one daemon instance to another daemon instance. Further, it may be unclear how a first daemon instance acknowledges that a reply message that arrives over a control message is actually destined for another daemon instance a (e.g., where a CSR reply message that lands on the egressing daemon instance or the daemon instance that hosts the connection with the network manager) and transfer that message back to the originating daemon instance where the edge device is connected while providing complete backward compatibility with the software or firmware executed on the network manager and/or the network controller. A software and/or firmware change or upgrade at the network manager is also non-ideal.

Thus, the examples described herein seek to overcome the above issues and quadruple the scale-number of DTLS sessions that may be concurrently supported at the orchestrator device that may have otherwise been able to support approximately 1,500 DTLS sessions. Further, the examples described herein allow the number of concurrent DTLS sessions within the overlay network to be quadrupled without code changes being done at other controllers or the on-boarding edge devices that are on-premises in nature.

Examples described herein provide a method of creating a connection between a controller and plurality of edge devices may include reading, by a data plane development kit (DPDK) of the controller, a plurality of packets having a common destination port from the plurality of edge devices, and demuxing, by the DPDK, a number of frames of the plurality of packets based on a hash of the plurality of packets, the hash altering the common destination port of the plurality of packets with a corresponding number of sham destination ports. The method may also include, with a TUNTAP interface, injecting the plurality of packets into a network kernel, and with the network kernel, delivering the plurality of packets to a respective one of a plurality of daemon instances.

The plurality of packets may be assigned to the one of the plurality of daemon instances based on which of the plurality of daemon instances is listening on the common destination port. The DPDK may exist in a user space of the controller. The method may further include, via the DPDK, determining a number of instances among the plurality of packets. The method may further include, storing the hash of the plurality of packets in a static cache. The plurality of packets may include Datagram Transport Layer Security (DTLS) packets. The hash may be computed using a source IP and a source port <SRC IP, SRC PORT> of the plurality of packets, the hash including an offset.

The method may further include terminating, via a first daemon instance of the plurality of daemon instances, a session associated with a first packet of the plurality of packets, transmitting a learning (LRN) peer event notification to a second daemon instance acting as a master daemon, and transmitting, via the second daemon instance, the LRN peer event notification to at least a third daemon instance to synchronize state information between the first daemon instance, the second daemon, and the third daemon.

The method may further include receiving a first register request from a first edge device of the plurality of edge devices at a first daemon instance of the plurality of daemon instances, and creating, at the first edge device, a transaction identification (ID) within a second register request, the transaction ID being generated within a space of the first daemon instance. The method may further include transmitting the second register request to a second daemon instance of the plurality of daemon instances, forwarding, by the second daemon instance, the second register request over a hosted session with a network management system, and signing, with the network management system, a certificate associated with the second register request based on the transaction ID. The method may further include transmitting second register request including a signed certificate to the second daemon instance, at the second daemon instance, looking up the transaction ID of the second register request in a transaction ID database local to the second daemon instance, forwarding the second register request to the first daemon instance based on a determination that the transaction ID of the second register request is not found in the transaction ID database local to the second daemon instance, and at the first daemon instance, transmitting the signed certificate in a register reply to the first edge device based on the transaction ID.

Examples described herein also provide a non-transitory computer-readable medium storing instructions that, when executed, causes a processor to perform operations, including reading, by a data plane development kit (DPDK) of a controller, a plurality of packets having a common destination port from a plurality of edge devices, demuxing, by the DPDK, a number of frames of the plurality of packets based on a hash of the plurality of packets, the hash altering the common destination port of the plurality of packets with a corresponding number of sham destination ports, with a TUNTAP interface, injecting the plurality of packets into the network kernel, and with the network kernel, delivering the plurality of packets to a respective one of a plurality of daemon instances.

The plurality of packets may be assigned to the one of the plurality of daemon instances based on which of the plurality of daemon instances is listening on the common destination port. The DPDK may exist in a user space of the controller. The operations may further include, via the DPDK, determining a number of instances among the plurality of packets. The operations further including storing the hash of the plurality of packets in a static cache. The plurality of packets include Datagram Transport Layer Security (DTLS) packets. The hash may be computed using a source IP and a source port <SRC IP, SRC PORT> of the plurality of packets, the hash including an offset.

Examples described herein also provide a system including a processor, and a non-transitory computer-readable media storing instructions that, when executed by the processor, causes the processor to perform operations including reading, by a data plane development kit (DPDK) of a controller, a plurality of packets having a common destination port from a plurality of edge devices, demuxing, by the DPDK, a number of frames of the plurality of packets based on a hash of the plurality of packets, the hash altering the common destination port of the plurality of packets with a corresponding number of sham destination ports, with a TUNTAP interface, injecting the plurality of packets into a network kernel, and with the network kernel, delivering the plurality of packets to a respective one of a plurality of daemon instances.

The plurality of packets may be assigned to the one of the plurality of daemon instances based on which of the plurality of daemon instances is listening on the common destination port. The operations may further include storing the hash of the plurality of packets in a static cache. The hash is computed using a source IP and a source port <SRC IP, SRC PORT> of the plurality of packets, the hash including an offset.

Additionally, the techniques described in this disclosure may be performed as a method and/or by a system having non-transitory computer-readable media storing computer-executable instructions that, when executed by one or more processors, performs the techniques described above.

Turning now to the figures, FIG. 1 illustrates a system-architecture diagram of a network environment, according to an example of the principles described herein. The network 100 may include a wide area network (WAN) fabric or overlay network, or other type of network environment. In one example, the network 100 may execute on top of one or more transport networks 108 to interconnect geographically distributed LANs or sites that may be made available to a number of edge devices 124-1, 124-2, . . . 124-N, where N is any integer greater than or equal to 1 (collectively referred to herein as edge device(s) 124 unless specifically addressed otherwise). In one example, the edges devices 124 may include a number of WAN edge routers. In one example, the geographically distributed LANs or sites may include, for example, a data center, a campus, a branch office, a cloud service provider network, or other layer 2 (L2) or layer 3 (L3) LANs.

An example of an implementation of the network 100 may include Cisco® Software-Defined WAN (SD-WAN) platform. However, for the network 100 and any other system described herein, there may be additional or fewer components in similar or alternative configurations. The illustrations and examples provided herein are for conciseness and clarity. Other examples may include different numbers and/or types of elements, but such variations do not depart from the scope of the present disclosure.

The network 100 may logically include an orchestration plane 102, a management plane 104, a control plane 106, and a data plane 110. The orchestration plane 102 may assist in the automatic authentication and registration of the physical and/or virtual network devices of the overlay network. Although network devices may be on-boarded manually through a command line interface (CLI) where an administrator enters configuration information line by line into each network device and enter operational commands one at a time into each network device in order to read and write status information. This method may be error prone and is time consuming. In addition, configuration may be difficult when devices are in remote locations or when management ports are inaccessible. The orchestration plane 102 may improve upon conventional network on-boarding by enabling deployment of the network (e.g., a WAN fabric) as a whole, efficiently and easily, as opposed to a piecemeal approach that deals with individual network devices one at a time, and by automating much of the initialization of the fabric.

The orchestration plane 102 may include one or more physical or virtual WAN orchestrators 112. Although a plurality of orchestrators 112 may be implemented as distinct network appliances, in one example, the orchestrators 112 and the other network devices deployed in the network 100 may be integrated in various combinations. For example, one or more orchestrators 112 may run on the same physical servers as one or more management systems 114 (e.g., WAN management systems) and/or fabric controllers 116 (e.g., WAN fabric controllers) in some cases. In one example, one or more fabric controllers 116 may run on the same physical servers as one or more edge devices 124, and so on. The orchestrator 112 may authenticate the management system 114, the fabric controllers 116, the edge devices 124, and other network devices deployed in the network 100. Further, the orchestrator 112 may coordinate connectivity among these network devices. The orchestrator 112 may authenticate the network devices using certificates and cryptography and may establish connectivity among the devices using point-to-point (p2p) techniques.

In one example, the orchestrator 112 may have a public network address (e.g., an IP address, a DNS name, etc.) so that the management system 114, the fabric controllers 116, the edge devices 124, and other network devices deployed in the network 100 may connect to the orchestrators for on-boarding onto the overlay network. The orchestrators 112 may coordinate the initial control connections among the management system 114, the fabric controllers 116, the edge devices 124, and other network devices deployed in the network 100. For example, the orchestrator 112 may create secure tunnels (e.g., Datagram Transport Layer Security (DTLS), Transport Layer Security (TLS), etc.) to the management system 114 and/or to the fabric controllers 116. The orchestrator 112 may also create secure tunnels (not shown) to the edge devices 124 and other network devices in the network 100 so that the devices may mutually authenticate each other. This authentication behavior may assure that only valid devices may participate in the overlay network. In one example, the secure connections between the orchestrator 112 and the management system 114 and between the orchestrator 112 and the fabric controllers 116 may be persisted so that the orchestrators may inform the management systems and the controllers when new edge devices 124 or other overlay network devices join the fabric. The secure connections with the edge devices 124 may be temporary; once the orchestrator 112 has matched an individual edge device 124 with an individual fabric controller 116, there may be no need for the orchestrators and the routers to communicate with one another. The orchestrator 112 may share the information that is required for control plane connectivity, and instruct the management system 114, the fabric controllers 116, the edge devices 124, and other network devices deployed in the network 100 to initiate secure connectivity with one other.

To provide redundancy for the orchestrator 112, multiple orchestrators may be deployed in the network 100, and different subsets of the management systems 114, the fabric controllers 116, the edge devices 124, and other overlay network devices may point to different orchestrators. An individual orchestrator 112 may maintain the secure connections with multiple fabric controllers 116. If one orchestrator 112 becomes unavailable, the other orchestrators 112 may automatically and immediately sustain the functioning of the overlay network. In a deployment with multiple fabric controllers 116, the orchestrator 112 may pair an individual edge device 124 with one of the fabric controllers 116 to provide load balancing. In one example, one or more physical or virtual Cisco® SD-WAN vBond orchestrators may operate as the orchestrator 112.

The management plane 104 may be responsible for central configuration and monitoring of the fabric, among other tasks. The management plane 104 may include one or more physical or virtual management systems 114. In one example, the management system 114 may provide a dashboard to operate as a visual window for users into the network 100 and allow for the configuration and the administration of the orchestrator 112, the management system 114, the fabric controllers 116, the edge devices 124, and other network devices deployed in the network 100. In one example, the management system 114 may be situated in a centralized location, such as, for example, an organizational data center, co-location facility, cloud service provider network, and the like.

The management system 114 may also store certificate credentials and create and store configuration information for the management systems 114, the fabric controllers 116, the edge devices 124, and other network devices deployed in the network 100. As network devices of the overlay network come online, they may request their certificates and configuration information from the management system 114, and the management systems may push the certificates and configuration information to the requesting network devices. For cloud-based network devices, the management system 114 may also sign certificates and generate bootstrap configuration information and decommission devices. In one example, the management system 114 may include one or more physical or virtual Cisco® SD-WAN vManage Network Management Systems.

The management plane 104 may also include an analytics engine 126 for providing visibility into the performance of applications and the network 100. The analytics engine 126 may provide graphical representations of the network 100 and enable an administrator to drill down to display the characteristics of an individual carrier or transport network 108, tunnel, application, or other element of the network 100 at a particular time. The analytics engine 126 may include a dashboard (e.g., stand-alone or integrated into the dashboard of the management system 114 or other systems) that may serve as an interactive overview of the network 100 and an entrance point into the state of the network at various levels of granularity. For example, the dashboard may display information for the last 24 hours (or other time period) by default and enable an administrator to drill up or down to select different time periods for different data sets to display. The dashboard may display data for network availability, WAN performance by transport network 108, applications, etc. The analytics engine 126 may calculate application performance with virtual quality of experience (vQoE) values, which may be customized for individual applications. For example, the vQoE value may range from zero to ten, with zero being the worst performance and ten being the best. The analytics engine 126 may calculate vQoE based on latency, loss, and jitter, and other custom metrics for each application. The analytics engine 126 may offer insight into planning the network 100, and into its operational aspects, such as historical performance, forecasting, and so forth, to provide recommendations for optimizing the network 100. The analytics engine 126 may store months of data, apply machine learning algorithms, and provide unique insights and recommendations into the network 100.

Some of the features and functions implemented by the analytics engine 126 may include network and application visibility, forecasting, and what-if-scenario evaluation, among others. The analytics engine 126 may provide visibility into application and network performance based on information collected from the network 100 as well as correlated information from other networks. This may provide insight into top to bottom performing applications as well as anomalous applications over a period of time. For example, application performance visibility may include best and worst performing applications (e.g., displaying the best and worst performing applications and drilling down to details at the site level), most bandwidth consuming applications (e.g., displaying applications consuming the most bandwidth and drilling down to sites and users), and anomalous application families (e.g., displaying changes in bandwidth consumption over a period of time), among others. Network performance visibility may include network and circuit availability (e.g., displaying network availability and correlating network and circuit availability), health views of the transport networks 108 (e.g., displaying providers and their network characteristics), and best and worst performing tunnels (e.g., displaying the best and worst performing tunnels and circuits and the providers on which they run), among others. Forecasting may help plan for the sites that may need additional bandwidth in the next three to six months. What-if scenarios may help identify opportunities for balancing cost, performance, and availability of networks and applications. In one example, one or more physical or virtual Cisco® SD-WAN vAnalytics appliances may operate as the analytics engine 126.

The control plane 106 may build and maintain the topology of the overlay network and make decisions on where traffic flows. The control plane 106 may work with the orchestration plane 102 and the management plane 104 to authenticate and register the orchestrator 112, the management system 114, the fabric controllers 116, the edge devices 124, and other network devices deployed in the network 100, and to coordinate connectivity among the devices. The control plane 106 may include one or more physical or virtual fabric controllers 116-1, 116-2, . . . 116-N, where N is any integer greater than or equal to 1 (collectively referred to herein as fabric controller(s) 116 unless specifically addressed otherwise). The fabric controllers 116 may oversee the control plane 106, establishing, adjusting, and maintaining the connections that form the fabric of the overlay network. Some of the functions and features implemented by the fabric controllers 116 include secure control plane connectivity, overlay management protocol (OMP), authentication, key reflection and rekeying, policy, and multiple configuration modes, among others.

An individual fabric controller 116 may establish and maintain an individual secure control plane connection (e.g., DTLS, TLS, etc.) with each other controller 116 of the overlay network as well each individual edge device 124 of the overlay network. In one example deployments with multiple fabric controllers 116, a single fabric controller 116 may have an individual secure connection to each router of a subset of all of the edge devices 124 of the WAN fabric for load-balancing purposes. The individual secure connection may carry an encrypted payload between the individual fabric controller 116 and another controller and between the controller and the individual edge device 124. This payload may include route information for the fabric controller 116 to determine the network topology, calculate the best routes to network destinations, and distribute the route information to the edge devices 124 under the controller's administrative control (e.g., authenticated and registered by the controller). The secure connection between an individual fabric controller 116 and an individual edge device 124 may be a persistent connection. In one example, the fabric controllers 116 may not have direct peering relationships with devices that the edge devices 124 connect to on the service side or LAN-side of the routers.

OMP is a routing protocol similar to BGP in some respects that may be used to manage the WAN fabric. OMP may run inside the secure control plane connections, and carry the routes, next hops, keys, policy information, and the like, to establish and maintain the fabric. OMP may run between the fabric controllers 116 and the edge devices 124 over the secure connections, and, in some cases, may carry only control plane information. The fabric controllers 116 may process the routes and advertise reachability information learned from these routes to other controllers and the edge devices 124 forming the overlay network.

In one example, the fabric controllers 116 may have pre-installed, tamper-proof credentials that allow them to authenticate new controllers and new edge devices 124 that come online. These credentials may ensure that only authenticated devices are allowed access to the overlay network. In addition, the fabric controllers 116 may receive data plane keys from an individual edge device 124 and reflect them to other routers to send data plane traffic. The fabric controllers 116 may also operate a policy engine that may provide inbound and outbound policy constructs to manipulate routing information, access control, segmentation, extranets, and other network operations. The fabric controllers 116 may also support various network configuration channels, such as Network Configuration Protocol (NETCONF)/Yet Another Next Generation (YANG) data modeling, Restful State Transfer (REST) on top of NETCONF/YANG (RESTCONF), Simple Network Management Protocol (SNMP), Syslog, Secure Shell (SSH)/Telnet, or other CLI, among other network configuration channels.

The fabric controllers 116 may maintain a centralized route table that stores the route information that the fabric controllers 116 learn from the edge devices 124 and from other controllers of the overlay network. Based on the configured policy, the fabric controllers 116 may share this route information with the edge devices 124 so that the routers may communicate with each other. During the initial startup of an individual fabric controller 116, an administrator may enter minimal configuration information, such as the network addresses or other unique identifiers of the controller and the orchestrator 112. For example, the identifiers may include IP addresses, MAC addresses, device serial numbers, hostnames, DNS names, labels, or tags, etc. With this information and a root-of-trust (RoT) public certificate, the individual fabric controller 116 may authenticate itself within the overlay network, establish the secure connections with the orchestrator 112 and the secure connections with other network devices in the network 100, and receive and activate its full configuration from the management system 114. The individual fabric controller 116 may then begin participating in the overlay network.

To provide redundancy and high availability, the network 100 may include multiple fabric controllers 116. To ensure that OMP routes remain synchronized, multiple fabric controllers 116 may have the same configuration for policy and OMP. The configuration for device-specific information, such as interface locations and addresses, system identifiers, host names, and the like, may be different. In a deployment with redundant fabric controllers 116, the orchestrator 112 may identify an individual fabric controller 116 to other controllers, and coordinate which of the controllers and which of the edge devices 124 may accept connections to one another. Different edge devices 124 in the same domain may connect to different fabric controllers 116 for load balancing purposes. If one fabric controller 116 becomes unavailable, the other controllers may automatically and immediately sustain the functioning of the overlay network. In one example, one or more Cisco® SD-WAN vSmart controllers may operate as the fabric controllers 116.

The data plane 110 may be responsible for forwarding packets based on decisions from the control plane 106. The data plane 110 may include the edge devices 124, which may be physical or virtual network devices for routing and forwarding traffic (e.g., switches, routers, hubs, gateways, bridges, etc.). Some of the features and functions implemented by each edge device 124 may include control plane connectivity (e.g., DTLS, TLS, etc.) over the secure connections, OMP, conventional control plane protocols (e.g., Open Shortest Path First (OSPF), Border Gateway Protocol (BGP), Virtual Router Redundancy Protocol (VRRP), Bidirectional Forwarding Detection (BFD), etc.), a Routing Information Base (RIB) (e.g., multiple route tables that may be populated automatically with direct interface routes, static routes, and dynamic routes learned via BGP, OSPF, etc.), a Forwarding Information Base (FIB) (e.g., a distilled version of the RIB that the router may use to forward packets), multiple network configuration channels (e.g., NETCONF, RESTCONF, SNMP, Syslog, SSH/Telnet, CLI, etc.), key management (e.g., symmetric keys used for secure communication with other routers), and data plane operations (e.g., IP forwarding, IP Security (IPSec), BFD, Quality of Service (QoS), Access Control Lists (ACLs), mirroring, policy-based forwarding, etc.), among others.

The edge devices 124 may operate within various LANs or sites associated with an organization, such as in one or more data centers, campus networks, branch offices, and co-location facilities, among others, or in the cloud (e.g., Infrastructure as a Service (IaaS), Platform as a Service (PaaS), Software as a Service (SaaS), and other Cloud Service Provider (CSP) networks) (not shown). The edge devices 124 may provide secure data plane connectivity (e.g., IPSec, Generic Routing Encapsulation (GRE), etc.) among the sites by establishing secure tunnels with one another across one or more carrier or transport networks 108, such as the Internet 118 (e.g., Digital Subscriber Line (DSL), cable, etc.), Multiprotocol Label Switching (MPLS) network 120 (or other private packet-switched network (e.g., Metro Ethernet, Frame Relay, Asynchronous Transfer Mode (ATM), etc.), LTE network 122 (or other mobile networks (e.g., 3G, 4G, 5G, etc.)), or other WAN (e.g., SONET, SDH, Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.).

The edge devices 124 may be responsible for traffic forwarding, security, encryption, quality of service (QoS), and conventional routing (e.g., BGP, OSPF, etc.), among other tasks. In one example, physical or virtual Cisco® SD-WAN vEdge routers (sometimes also referred to as vEdges) or Cisco® Integrated Services Routers (ISRs), Cisco® Enterprise Network Convergence System (ENCS) routers, Cisco® Aggregation Services Routers (ASRs), and other Cisco® routers (sometimes referred to as cEdge routers or cEdges) may operate as the edge devices 124.

As mentioned above, in one example, the connections between a fabric controller 116 and a number of edge devices 124 may be initiated via the orchestrator 112. In one example, the orchestrator 112 may learn about the controllers 116 in the overlay by virtue of the live control connection sessions. In one example, with, for example, the Cisco® SD-WAN release 20.9, multi-instancing of the daemon (e.g., Cisco® vDaemon) may be implemented, and the live control connections' peering information may be distributed from one daemon instance to a number of other daemon instances.

Figure 2:
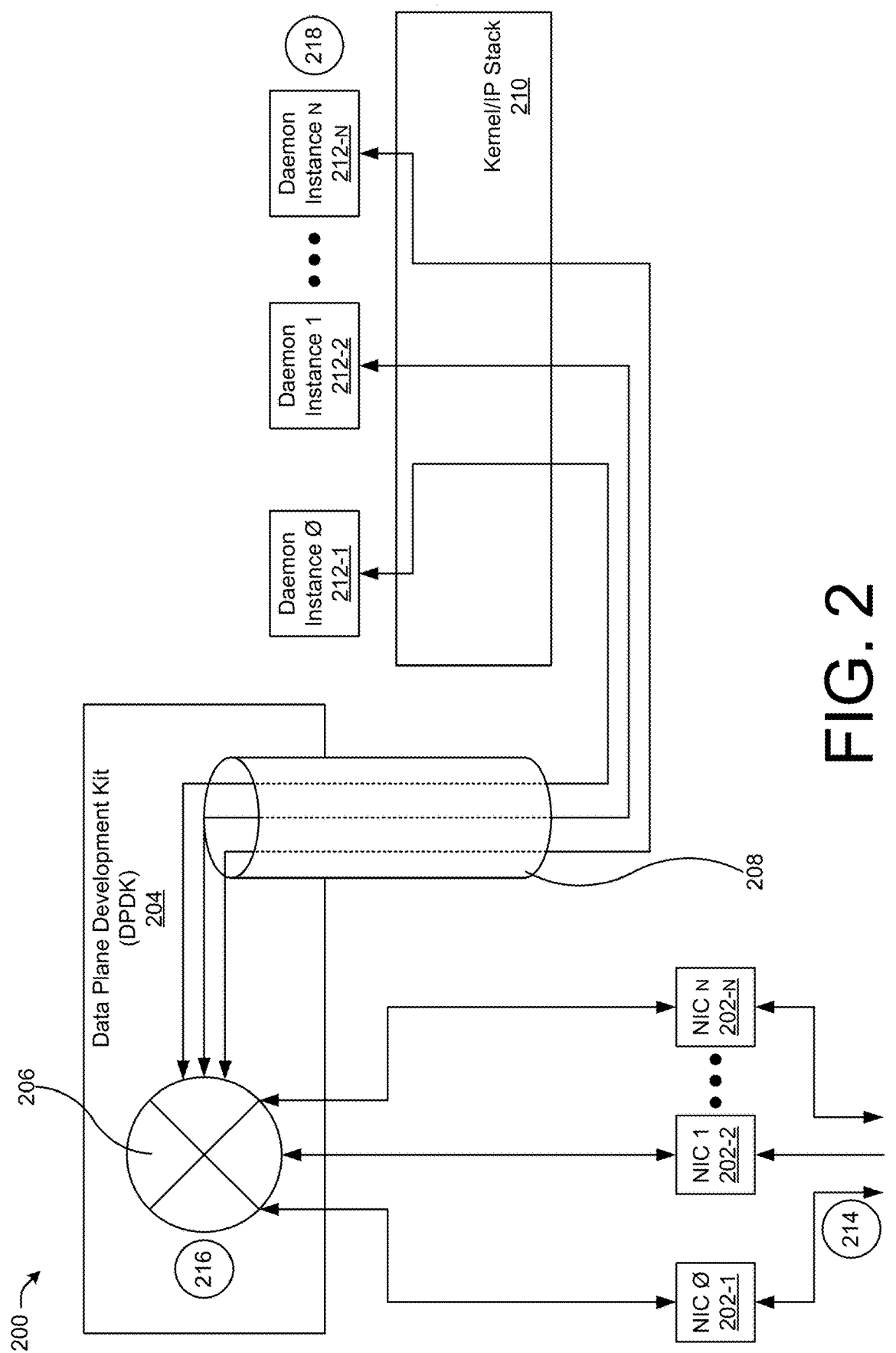
FIG. 2 illustrates a component diagram and of example components of an overlay network including call flow indicators, according to an example of the principles described herein.
Figure 3:
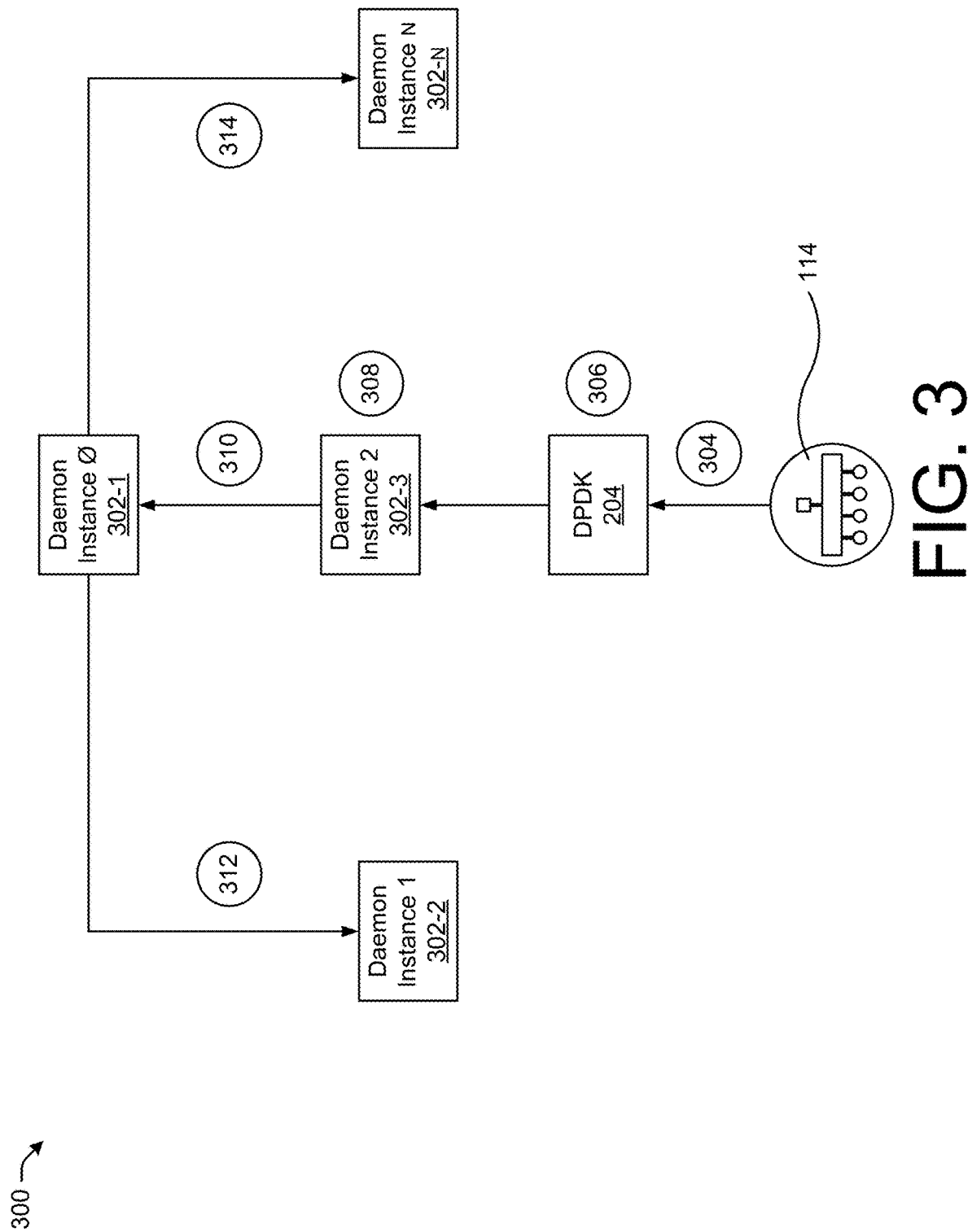
FIG. 3 illustrates a component diagram and of example components of an overlay network including call flow indicators, according to an example of the principles described herein.
Figure 4:
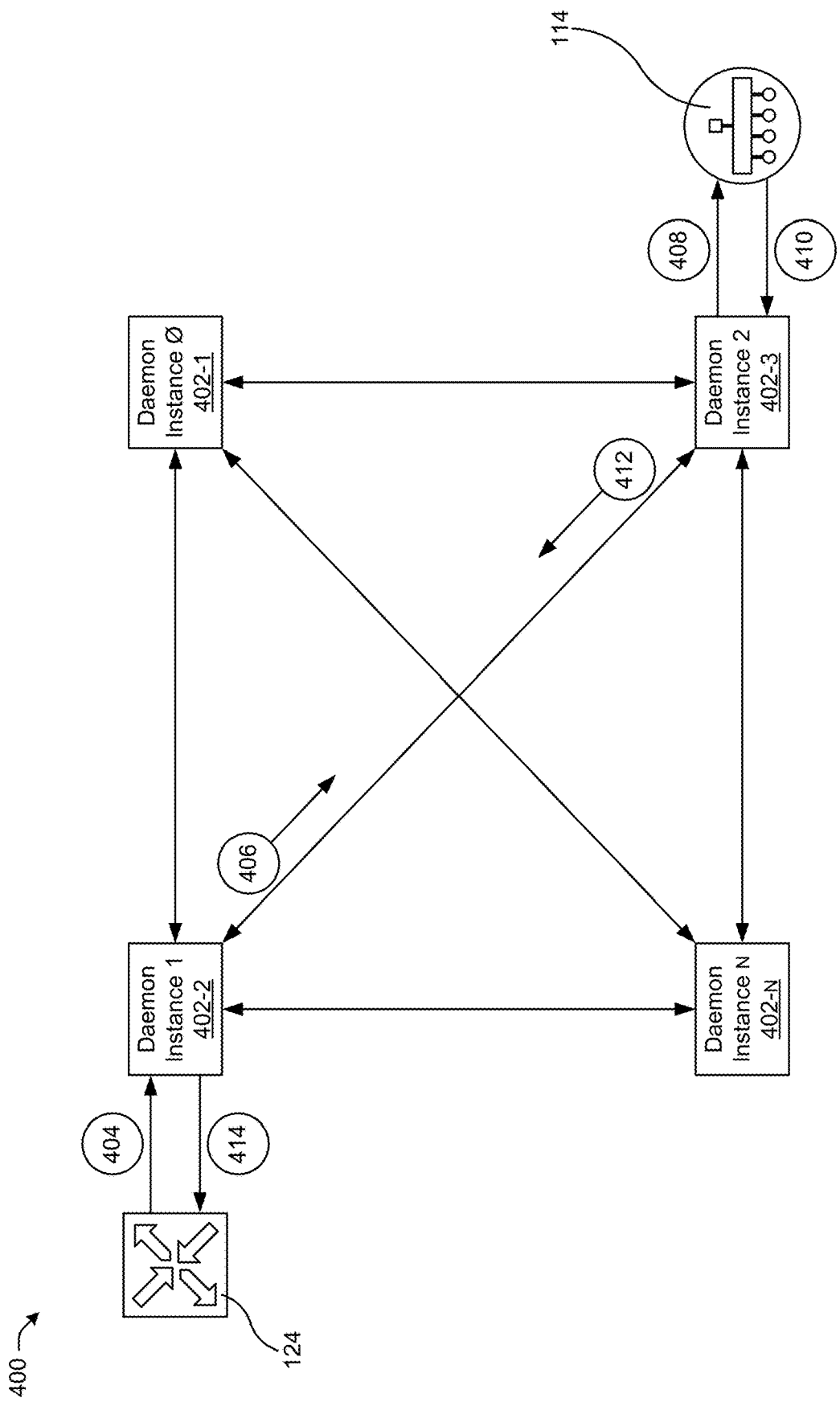
FIG. 4 illustrates a component diagram and of example components of an overlay network including call flow indicators, according to an example of the principles described herein.

The systems and methods of FIGS. 2 through 4 provide for efficient ways to on-board and manage edge devices 124 within the network 100.

Of these four components, the orchestrator 112, the management system 114, the fabric controllers 116, and the edge devices 124, the edge devices 124 may be hardware devices or software that runs as a virtual machine, and the remaining three may be software-only components. The management system 114, the fabric controllers 116 software may run on servers, and the orchestrator 112 software may run as a process (e.g., a daemon) on an edge router.

FIG. 2 illustrates a component diagram and of example components of an overlay network 200 including call flow indicators, according to an example of the principles described herein. The example of FIG. 2 relates to the presentation and maintaining of a "sham port" to assist in maintaining an appearance of a single, well-known destination DTLS port as viewed by a computing device outside of the overlay network 200. The systems and methods of FIG. 2 assist in determining what percentage of the inbound control connections each of the daemon instances may host. Further, the example of FIG. 2 ensures that no configuration or software changes at the controllers 116. Although in the example of FIG. 2 there is a single daemon instance that may physically own the well-known destination port, the other daemon instances may internally listen on other ports which are offsets to the actual physical port. Those other listening ports are not ephemeral but are offset from the well-known port. In the present architecture (e.g., Cisco® vBond architecture), a Data Plane Development Kit (DPDK) may scoop up packets from a number of physical or virtual network interface cards (NICs) 202-1, 202-2, . . . 202-N, where N is any integer greater than or equal to 1 (collectively referred to herein as NIC(s) 202 unless specifically addressed otherwise). The NICs 202 may forward the packet onto a kernel/IP stack 210 (e.g., a Linux kernel/IP stack). Before forwarding the packet, a hash based on the source IP and source port of the incoming connection may be computed. The computation of the hash such as a hash mod number of the daemon instances may provide an offset value which will be added and written to the destination port of the inbound packet. The packet may then be transmitted to the kernel/IP stack 210 for control connection hosting. On the reverse path including traffic emanating from a daemon instance, in the DPDK, the source port may be restored to maintain the appearance of the single port to the external world. Being a hash-based solution implemented in the DPDK 204, the example of FIG. 2 provides an appropriate distribution DTLS session across the different daemon instances. Further, with minimal code and/or enhancement efforts through the methods and systems of FIG. 2, live add and/or live removal of a data processing device (e.g., a CPU core) may also be supported.

With this overview, details regarding packet transmission throughout the system of FIG. 2 will now be described. The physical and/or virtual elements of FIG. 2 may be included within the orchestrator 112, the management system 114, the fabric controllers 116, or combinations thereof. At 214 of FIG. 2, a number of packets (e.g., DTLS packets) that designate the same destination port may be received from a number of computing devices such as the edge devices 124 of FIG. 1 at a number of interfaces. The interfaces may include a number of physical or virtual network interface controllers (NICs) 202-1, 202-2, . . . 202-N, where N is any integer greater than or equal to 1 (collectively referred to herein as NIC(s) 202 unless specifically addressed otherwise). In one example, the NICs 202 may be physical NICs.

The NICs 202 may send the packets which are, again, designated and sent to a single port to a DPDK 204. In one example, the DPDK 204 may employ a poll mode driver (PMD) that includes APIs, provided through the BSD driver running in user space, to configure the devices and their respective queues. Further, a PMD may access the receive (RX) and transmit (TX) descriptors directly without any interrupts (with the exception of Link Status Change interrupts) to quickly receive, process, and deliver packets in the application utilized by the user.

At 216, the DPDK 204 is aware of the existence of a plurality of daemon instances 212-1, 212-2, . . . 212-N, where N is any integer greater than or equal to 1 (collectively referred to herein as daemon instance(s) 212 unless specifically addressed otherwise), and the DPDK 204 may begin to de-multiplex (demux) the packets using a demultiplexing device 206. The daemon instances 212 may include any computer program executed as a background process. Further, the daemon instances 212 may include a listening service. In one example, the daemon instances 212 may include Cisco® virtual daemon (vDaemon) instances or other Cisco® SD-WAN software process. The plurality of daemon instances 212 in all examples described herein may be used in onboarding processes associated with, for example, the edge devices 124.

In one example, the DPDK 204 performs packet processing in the user space in order to provide more efficient packet processing performance. The demultiplexing device 206 overwrites the destination port of the packets with a new destination port to which the physical processes (e.g., the daemon instances 212) are listening. Thus, from a perspective exterior to the overlay network 200, the packets are bound to a single port. However, once the packets enter the overlay network 200, the different packets are demultiplexed into separate, new destination ports.

In one example, a static hash may be executed to demultiplex the packets by the demultiplexing device 206 within the DPDK 204. In one example, the static hash may be computed based on a source IP and a source port (e.g., <SRC IP, SRC PORT>) of the plurality of packets. Further, as mentioned herein, the hash creates and includes an offset which may be added to the new destination port. Each packet that has been demultiplexed, hashed, and had the offset applied may be sent to one of the daemon instances 212. For example, a first packet with a first new destination port may be sent to a corresponding daemon instance 212 that is listening on that first new destination port. Because these new destination ports are associated with daemon instances, from a perspective exterior to the overlay network 200, the packets are bound to a single port and the existence of the new destination ports associated with the daemon instances 212 is unknown.

Once the packets are demultiplexed and are assigned new destination ports and offsets, the packets may then be transmitted via a tunnel/network tap (TUN/TAP) 208. The TUN/TAP 208 may provide packet RX and TX for a user space program such as, for example, the daemon instances 212. In one example, the TUN/TAP 208 may include a point-to-point (p2p) or Ethernet device, which may receive the packets from a user space program and writes the packets to the user space program (e.g., the daemon instances 212). The TUN/TAP driver may build a virtual network interface on a host where the interface functions to allow for the assignment of an IP, analyzing traffic, and route traffic, etc. When the traffic is sent to the interface, the traffic is sent to the user space program rather than the real network. There are two driver modes for TUN/TAP; TUN and TAP. TUN and TAP may include kernel virtual network devices. The TUN (tunnel) devices operates at L3, meaning the packets received from the file descriptor may be IP based. Data written back to the device is also in the form of an IP packet. TAP (network tap) operates much like TUN but instead of only being able to write and receive L3 packets to/from the file descriptor, TAP may use raw ethernet packets. In the present systems and methods, the TUN/TAP 208 may acts as a conduit through which the processed DPDK packets are introduced into the network current of the kernel/IP stack 210 and are directed to the intended daemon instances 212.

Turning again to FIG. 2, the kernel/IP stack 210 receives the packets including their newly assigned destination ports and offsets for control connection hosting. The kernel/IP stack 210 may deque the packets from the TUN/TAP 208 and, at 218, hand the packets over to corresponding daemon instances 212 that are listening on the respective newly assigned destination ports. Thus, the packet may be assigned to a daemon instance 212 based on the newly assigned destination ports. The use of the terminology "sham port" relates to the fact that although there is a single daemon instance that would physically own the well-known destination port, the other daemon instances 212 internally would listen on other ports which are offsets to the actual physical port making the single daemon instance a fake or "sham" port.

As to traffic flowing in the direction of the edge devices 124 and emanating from a daemon instance 212 (e.g., the reverse path), the DPDK 204 may restore the source port to maintain the semblance of the single port and the single daemon instance to a user or computing device outside the overlay network 200.

Utilizing the systems and methods of the example of FIG. 2 provides for an effective and efficient distribution DTLS session across different daemon instances 212 since it includes a hash-based solution implemented in the DPDK 204. Further, the present systems and methods provide for minimal code and/or enhancement effort to the orchestrator 112, the management system 114, the fabric controllers 116, the edge devices 124, and other network devices deployed in the network 100. Further, the present systems and methods provide for live add or live removal of processors and other computing resources. Still further, through the use of present systems and methods, the number of DTLS sessions that may be concurrently supported at the orchestrator 112 may be easily scaled to allow the number to be quadrupled without code changes being done at the orchestrator 112, the management system 114, or the fabric controllers 116 or the on-boarding edge platforms.

Turing now to an associated system and method, FIG. 3 illustrates a component diagram and of example components of an overlay network 300 including call flow indicators, according to an example of the principles described herein. The overlay network 300 may include a management system 114, a DPDK 204, and a plurality of daemon instances 302-1, 302-2, 302-3, . . . 302-N, where N is any integer greater than or equal to 1 (collectively referred to herein as daemon instance(s) 302 unless specifically addressed otherwise).

The overlay network 300 may assist in providing a low overhead process to allow peering information associated with the orchestrator 112, the management system 114, the fabric controllers 116, the edge devices 124, and other network devices deployed in the overlay network 300 to be synchronized from one daemon instance to another. Inter-process communication (IPC) channels or messages may be used to synchronize from one daemon instance to another daemon instance on a periodic basis. Typically, these control events are relayed via an out of band (e.g., non-data) traffic network like control virtual LANs (VLANs) or special VLANs. A VLAN may include a group of devices on one or more LANs that are configured to communicate as if they were attached to the same wire, when in fact they are located on a number of different LAN segments. Because VLANs are based on logical instead of physical connections, they are extremely flexible, and such mechanisms may be utilized for high-end or powerful load balanced architectures.

In the example of FIG. 3, a low overhead, message-queue and IPC based protocol buffer encapsulation may be implemented to stitch all daemon instances one-to-one (1:1) with a "master daemon" referred to as daemon instance 0. Thus, daemon instance □ will serve as a pivot point which will distribute controller information without needing to maintain point to point IPC queues between each daemon instance. The synchronization mechanism may include, at the turn of a first register-request message that comes from a controller peer, peer creation event information is chosen to be encapsulated and sent to daemon instance 0 which may, in turn, distribute the encapsulated first register-request message to all daemon instances except the source daemon instance. If and when the peer is removed due to time out or disconnect, the peer deletion event is relayed in a similar manner. Further, if any existing attribute in the peer structure changes at the source instance, that information may be synchronized as auxiliary information to other daemon instances via daemon instance 0. In this manner, the systems and methods of FIG. 3 include an event-based synchronization as opposed to a periodic synchronization. Whenever the creation event is emitted, a daemon instance including an instance ID that hosts the original session (e.g., a host daemon instance) may synchronize the auxiliary information and/or state with all other daemon instances within the overlay network 300. This information may be referred to as a hosted_vdaemon_instance at other daemon instances.

With this overview, details regarding packet transmission throughout the system of FIG. 3 will now be described. The management system 114 may be in communication with the DPDK 204. At 304, the packet transmitted over the connection between the management system 114 and the DPDK 204 may be hashed at 306. The DPDK 204 may then send the hashed packet onto a daemon instance 302. In the example of FIG. 3, daemon instance 2 302-3 is indicated as being the daemon instance 302 that receives the hashed packet and may be referred to as the host daemon instance.

The host daemon instance (e.g., daemon instance 2 302-3), a 308, may terminate the DTLS session with the orchestrator 112, the management system 114, the fabric controllers 116, or combinations thereof. Further, at 310, the host daemon instance (e.g., daemon instance 2 302-3) may transmit a learning (LRN) peer event notification to daemon instance 0 302-1 acting as the master daemon instance.

At 312 and 314, the master daemon instance (e.g., daemon instance 0 302-1) may dispatch the LRN peer event notification to all other daemon instances within the overlay network 300 including, for example, daemon instance 3 302-4 and daemon instance N 302-N as depicted in FIG. 3. Thus, in this manner, whenever a daemon instances learns new state information, that new state information is transmitted to the master daemon instance (e.g., daemon instance 0) which, in turn, dispatches that information on to all other daemon instances within the overlay network 300.

The IPC of FIG. 3 may be scalable. Further, the IPC of FIG. 3 may maintain a 1:1 relationship between the master daemon instance (e.g., daemon instance 0) and all other daemon instances in the overlay network 300 including, for example, daemon instance 2 302-3, daemon instance 3 302-4 and daemon instance N 302-N.

FIG. 4 illustrates a component diagram and of example components of an overlay network 400 including call flow indicators, according to an example of the principles described herein. The IPC example of FIG. 4 may be referred to as a 1:1, p2p IPC channel that exists between any two daemon instances and may be used for bidirectional communication. At a multi-instanced and/or scaled or non-scaled management system 114 and in one example, when a register request arrives from an edge device 124, the register request may be required to be relayed immediately onto the management system 114 and/or fabric controllers 116 prior to responding to with a register reply back to the edge device 124. The register reply message which may otherwise have been turned around immediately, may be kept pending until the response from the management system 114 and/or fabric controllers 116 arrives. The response from the management system 114 and/or fabric controllers 116 may dictate further decisions regarding how the edge device 124 may join the overlay network 400. In some examples as to how the edge device may join the overlay network may include (1) transmitting a certificate signing request (CSR) from an edge device to obtain a signed certificate (2) performing an embargo IP check, and (3) utilizing network address translation (NAT) hole-punch messages. With the multi-instance implementation, it may be unclear how to handle the messages that require transit from one daemon instance to another daemon instance. Further, it may be unclear how a first daemon instance acknowledges that a reply message that arrives over a control message is actually destined for another daemon instance a (e.g., where a CSR reply message that lands on the egressing daemon instance or the daemon instance that hosts the connection with the network manager) and transfer that message back to the originating daemon instance where the edge device is connected while providing complete backward compatibility with the software or firmware executed on the network manager and/or the network controller. A software and/or firmware change or upgrade at the network manager is also non-ideal.

To enable the return traffic behavior that may require the inbound proprietary message to transit onto a different daemon instance, additional TLVs and/or subTLVs may be embedded in the proprietary message exchange between the daemon instance/management system 114 and the daemon instance/orchestrator 112 such that the very presence of the embedded TLVs and/or subTLVs capture an identification (ID) of the source daemon instance. However, the additional TLVs and/or subTLVs may be considered as useless information to be carried in the CSR payload or embargo IP payload into the daemon instance/management system 114 only to be returned back without any consumption at the management system 114 so that the context of the originating edge device 124 may be revived and the register reply may be initiated.

The overlay network 400 of FIG. 4 may include a plurality of daemon instances 402-1, 402-2, 402-3, 402-N, where N is any integer greater than or equal to 1 (collectively referred to herein as daemon instances(s) 402 unless specifically addressed otherwise). The transaction ID space in, for example, an architecture of a single daemon instance 402, may include a running incremental number. This incremental number has been primarily used to track outstanding requests towards the management system 114 so that the edge devices 124 on behalf of which a CSR request was raised may be looked up with ease. In this example, the original register request may have been kept pending for replies. Whenever a new request is crafted on behalf of an edge device 124 to be sent to the management system 114 or a fabric controller 116, this transaction ID may be incremented and imprinted onto the payload. Transaction context may be saved in an internal transaction ID database in the form of, for example, a table. To allow multiple daemon instances 402 to effectively use the space, space among each daemon instance 402 may be divided so that subsequent incremented transaction IDs is set to a next number in the key space that is offset by the number of daemon instances 402. Stated another way, each daemon instance 402 may seed the transaction ID with its own instance ID. Further, transaction IDs sourced by the same daemon instance 402 may appear incremented by the number of daemon instances. For example, if the number of daemon instances 402 within the overlay network 400 is 3, then the transaction ID space of daemon instance 0 402-1 is {0, 3, 6, 9}; the transaction ID space of daemon instance 1 402-2 is {1, 4, 7, 10}, and the transaction ID space for daemon instance 2 402-3 is {2, 5, 8, 11}, and so on. Incrementing the transaction IDs of the daemon instances 402 ensures no overlap across a different daemon instance 402.

In instances where the daemon instance 402 that dequeues the payload (e.g., secure socket layer (SSL) payload) of the return message from the management system 114 does not find the transaction ID in its transaction ID table, that dequeuing daemon instance 402 may identify the originating daemon instance 402 by performing a modulus operation on the transaction ID. Performing the modulus operation may identify the originating daemon instance 402 and the dequeuing daemon instance 402 may forward the message to the originating daemon instance 402 via a separate IPC channel.

In one example, the separate IPC channel may be point-to-point in nature between two given daemon instances 402. These point-to-point channels may assist in the forward leg of the CSR request where the originating daemon instance 402 sends the CSR request to an intermediate daemon instance 402 which physically writes into the SSL session and that includes a control connection with the management system 114. A peer of the management system 114 may be picked from among the list of candidate sessions in order to dispatch the CSR request. An entry is made in a local transaction ID database according the logic described above. When the peer is local such as when a valid SSL session ID is present, the payload may be written immediately to the SSL layer. When the peer is not local, then a point-to-point IPC message that encapsulates the payload cannot be written to the SSL. Instead, the point-to-point IPC message may be sent to the intermediate daemon instance 402. The intermediate daemon instance 402 then issues the SSL write on behalf of the originating daemon instance. At the egress daemon instance, in the forward leg, no transaction ID entry is made into the transaction ID database.

With this overview, more details regarding packet transmission throughout the system of FIG. 4 will now be described. As mentioned above, the systems and methods of FIG. 4 utilize a 1:1 or p2p IPC channel that exists between any two daemon instances 402 for bidirectional communication. At 404 an edge device 124 may transmit a register request message to an original daemon instance such as, for example, daemon instance 1 402-2. The original daemon instance (hereinafter referred to as daemon instance 1 402-2) may generate a CSR message with a transaction ID in the space of daemon instance 1 402-2. Daemon instance 1 402-2 may transmit, at 406, the CSR message including the transaction ID to a second, intermediate daemon instance such as, for example, daemon instance 2 402-3. In one example, other daemon instances such as, for example, daemon instance 0 402-1 and daemon instance N 402-N may not participate in the method. In one example, other daemon instances such as, for example, daemon instance 0 402-1 and daemon instance N 402-N may act as additional intermediary daemon instances by forwarding the CSR message including the transaction ID to the second, intermediate daemon instance (hereinafter referred to as daemon instance 2 402-3) after receiving the CSR message including the transaction ID from daemon instance 1 402-2.

In the example of FIG. 4, daemon instance 2 402-3 may receive the CSR message including the transaction ID from daemon instance 1 402-2, and, at 408, forward the CSR message including the transaction ID over a hosted DTLS session with the management system 114. The payload of the message may include the original transaction ID from the space of daemon instance 1 402-2.

The management system 114 signs the CSR and generates a certificate signing response (CS response) and includes a signed CSR and the original transaction ID from the space of daemon instance 1 402-2. At 410, the management system 114 may transmit the CS response to daemon instance 2 402-3. Daemon instance 2 402-3 may access its local transaction ID database to determine if the transaction ID database of daemon instance 2 402-3 includes the original transaction ID from the space of daemon instance 1 402-2. Since the original transaction ID was generated from the space of daemon instance 1 402-2, the original transaction ID will not be found in the transaction DB of daemon instance 2 402-3. Therefore, at 412, daemon instance 2 402-3 will forward the CS response to daemon instance 1 402-2.

Daemon instance 1 402-2 receives the CS response and located the original transaction ID. Daemon instance 1 402-2 may recover the register request and generates a register reply. At 414, daemon instance 1 402-2 may transmit the register reply including the signed CS response to the edge device 124. In this manner, the edge device 124 is authorized and onboarded with respect to the management system 114 and the overlay network 400.

Figure 5:
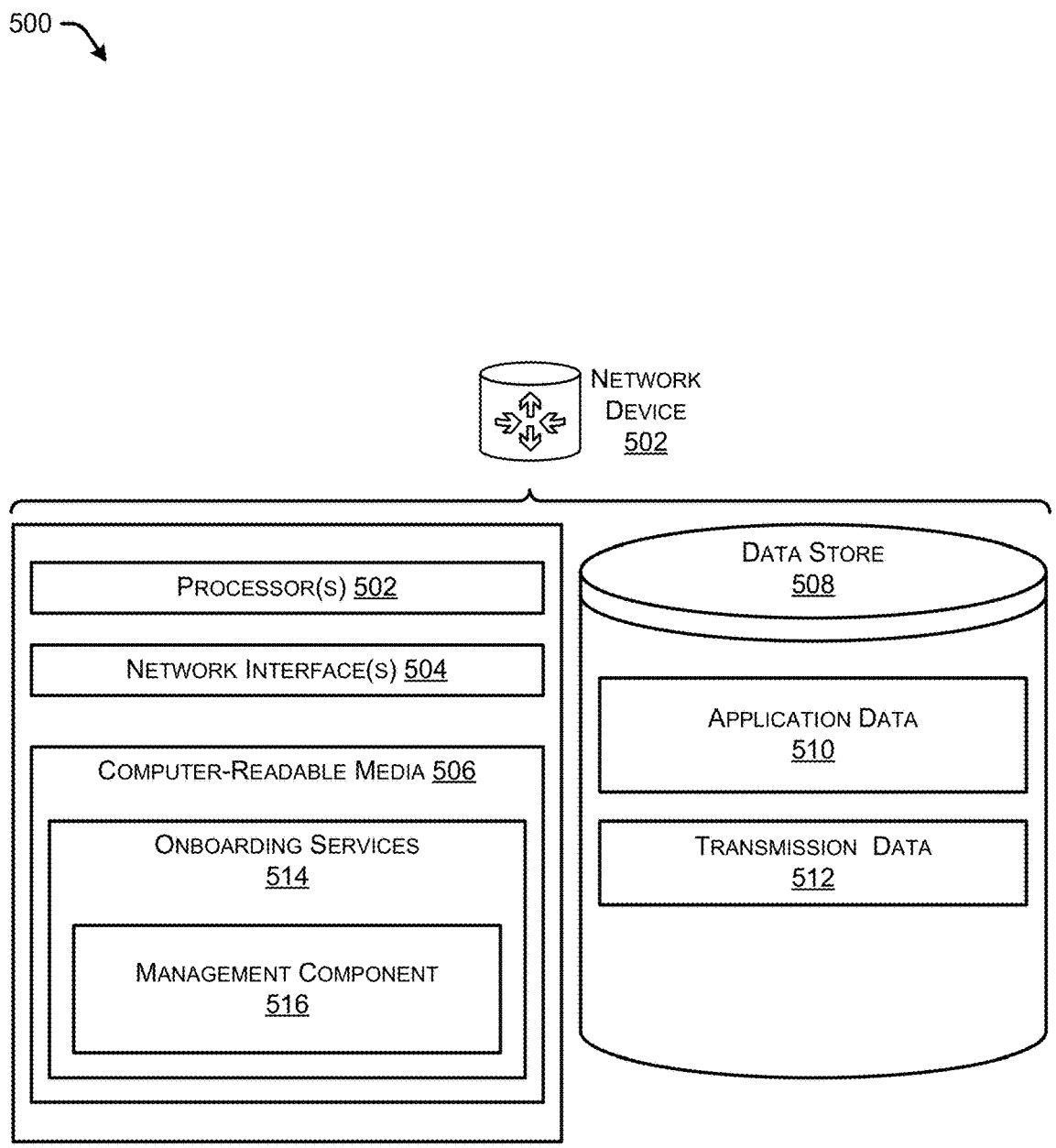
FIG. 5 is a component diagram of example components of a network device including a local agent, according to an example of the principles described herein.

FIG. 5 is a component diagram 500 of example components of a network device 502, according to an example of the principles described herein. The network device 502 may be embodied as hardware devices and/or software that runs as a virtual machine. Further, the network device 502 may run on servers or as processes on the orchestrator 112, the management system 114, the fabric controllers 116, the edge devices 124 and combinations thereof.

As illustrated, the network device 502 may include one or more hardware processor(s) 502 configured to execute one or more stored instructions. The processor(s) 502 may include one or more cores. Further, the network device 502 may include one or more network interfaces 504 configured to provide communications between the network device 502 and other devices, such as devices associated with the system architecture of FIG. 1 including the orchestrator 112, the management system 114, the fabric controllers 116, and the edge devices 124, and/or other systems or devices associated with the network device 502 and/or remote from the network device 502. The network interfaces 504 may include devices configured to couple to personal area networks (PANs), wired and wireless local area networks (LANs), wired and wireless wide area networks (WANs), and so forth. For example, the network interfaces 504 may include devices compatible with the orchestrator 112, the management system 114, the fabric controllers 116, and the edge devices 124 and/or other systems or devices associated with the network device 502.

The network device 502 may also include computer-readable media 506 that stores various executable components (e.g., software-based components, firmware-based components, etc.). In one example, the computer-readable media 506 may include, for example, working memory, random access memory (RAM), read only memory (ROM), and other forms of persistent, non-persistent, volatile, non-volatile, and other types of data storage. In addition to various components discussed herein, the computer-readable media 506 may further store components to implement functionality described herein. While not illustrated, the computer-readable media 506 may store one or more operating systems utilized to control the operation of the one or more devices that include the network device 502. According to one example, the operating system includes the LINUX operating system. According to another example, the operating system(s) include the WINDOWS SERVER operating system from MICROSOFT Corporation of Redmond, Washington. According to further examples, the operating system(s) may include the UNIX operating system or one of its variants. It may be appreciated that other operating systems may also be utilized.

Additionally, the network device 502 may include a data store 508 which may include one, or multiple, repositories or other storage locations for persistently storing and managing collections of data such as databases, simple files, binary, and/or any other data. The data store 508 may include one or more storage locations that may be managed by one or more database management systems. The data store 508 may store, for example, application data 510 defining computer-executable code utilized by the processor 502 to execute the methods described herein.

Further, the data store 508 may store a transmission data 512. The transmission data 512 may include any data obtained by the network device 502 regarding the transmission of messages between the orchestrator 112, the management system 114, the fabric controllers 116, and the edge devices 124, and/or other systems or devices associated with the network device 502 and/or remote from the network device 502 as well as between daemon instances, and other data described herein that may assist in the onboarding and management processes described herein.

The computer-readable media 506 may store portions, or components, of onboarding services 514. For instance, the onboarding services 514 of the computer-readable media 506 may include a management component 516 to, when executed by the processor(s) 502, onboard a number of edge devices 124 and manage the daemon instances throughout the overlay network as described herein. The management component 516 may include all or a portion of the executable code associated with the network device 502 and may be executed to bring about the functionality of the network device 502 as described herein.

Figure 6:
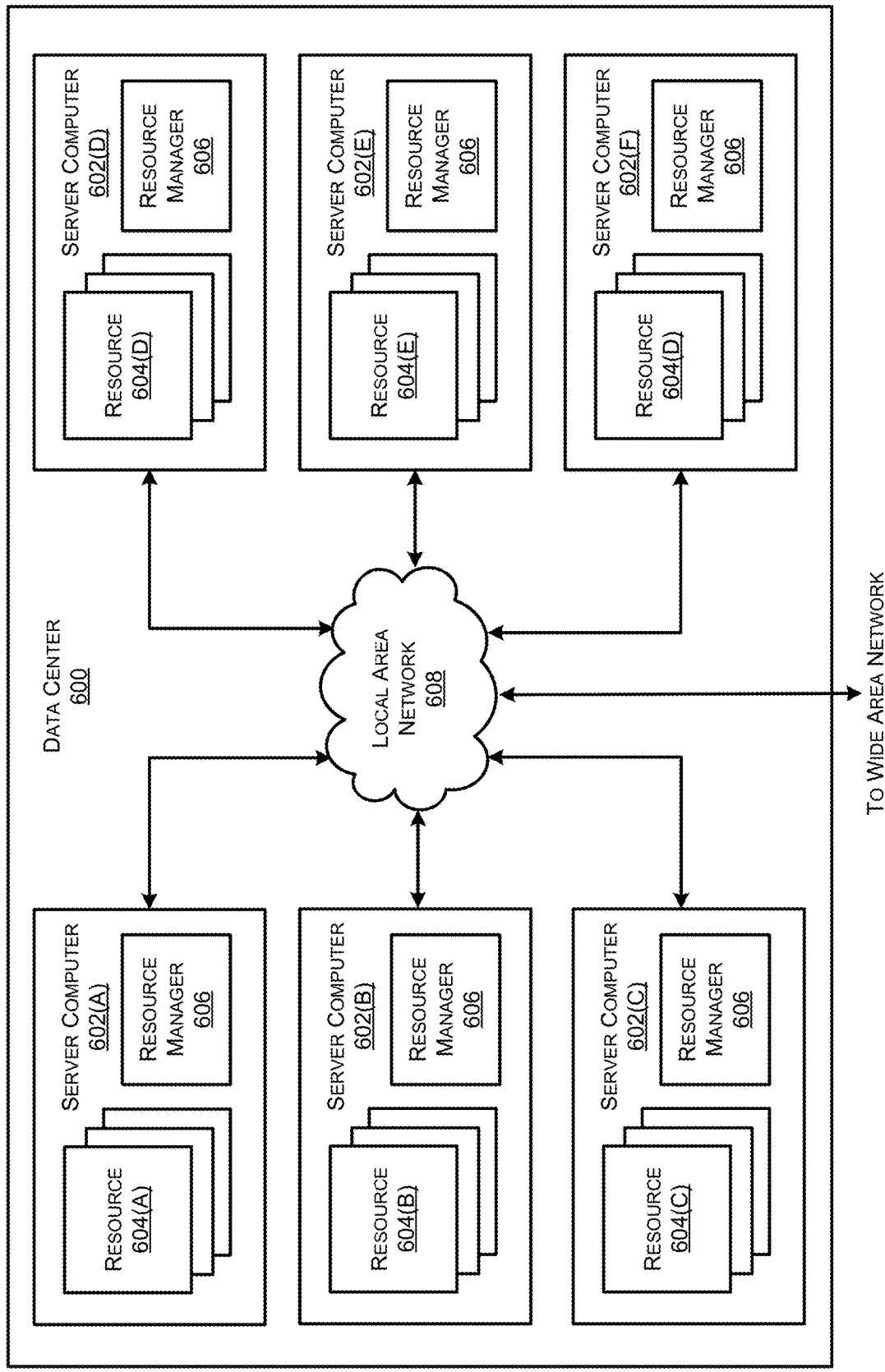
FIG. 6 illustrates a computing system diagram illustrating a configuration for a data center that may be utilized to implement aspects of the technologies disclosed herein.

FIG. 6 illustrates a computing system diagram illustrating a configuration for a data center 600 that may be utilized to implement aspects of the technologies disclosed herein. The example data center 600 shown in FIG. 6 includes several server computers 602A-602F (which might be referred to herein singularly as "a server computer 602" or in the plural as "the server computers 602) for providing computing resources. In some examples, the resources and/or server computers 602 may include, or correspond to, any type of networked device described herein. Although described as servers, the server computers 602 may include any type of networked device, such as servers, switches, routers, hubs, bridges, gateways, modems, repeaters, access points, etc.

The server computers 602 may be standard tower, rackmount, or blade server computers configured appropriately for providing computing resources. In some examples, the server computers 602 may provide computing resources 604 including data processing resources such as VM instances or hardware computing systems, database clusters, computing clusters, storage clusters, data storage resources, database resources, networking resources, virtual private networks (VPNs), and others. Some of the server computers 602 may also be configured to execute a resource manager 606 capable of instantiating and/or managing the computing resources. In the case of VM instances, for example, the resource manager 606 may be a hypervisor or another type of program configured to enable the execution of multiple VM instances on a single server computer 602. Server computers 602 in the data center 600 may also be configured to provide network services and other types of services.

In the example data center 600 shown in FIG. 6, an appropriate LAN 608 is also utilized to interconnect the server computers 602A-602F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 600, between each of the server computers 602A-602F in each data center 600, and, potentially, between computing resources in each of the server computers 602. It may be appreciated that the configuration of the data center 600 described with reference to FIG. 6 is merely illustrative and that other implementations may be utilized.

In some examples, the server computers 602 and/or the computing resources 604 may each execute/host one or more tenant containers and/or virtual machines to perform techniques described herein.

In some instances, the data center 600 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 604 provided by the cloud computing network may include various types of computing resources, such as data processing resources like tenant containers and VM instances, data storage resources, networking resources, data communication resources, network services, VPN instances, and the like.

Each type of computing resource 604 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 604 not mentioned specifically herein.

The computing resources 604 provided by a cloud computing network may be enabled in one example by one or more data centers 600 (which might be referred to herein singularly as "a data center 600" or in the plural as "the data centers 600). The data centers 600 are facilities utilized to house and operate computer systems and associated components. The data centers 600 typically include redundant and backup power, communications, cooling, and security systems. The data centers 600 may also be located in geographically disparate locations. One illustrative example for a data center 600 that may be utilized to implement the technologies disclosed herein is described herein with regard to, for example, FIGS. 1 through 6.

Figure 7:
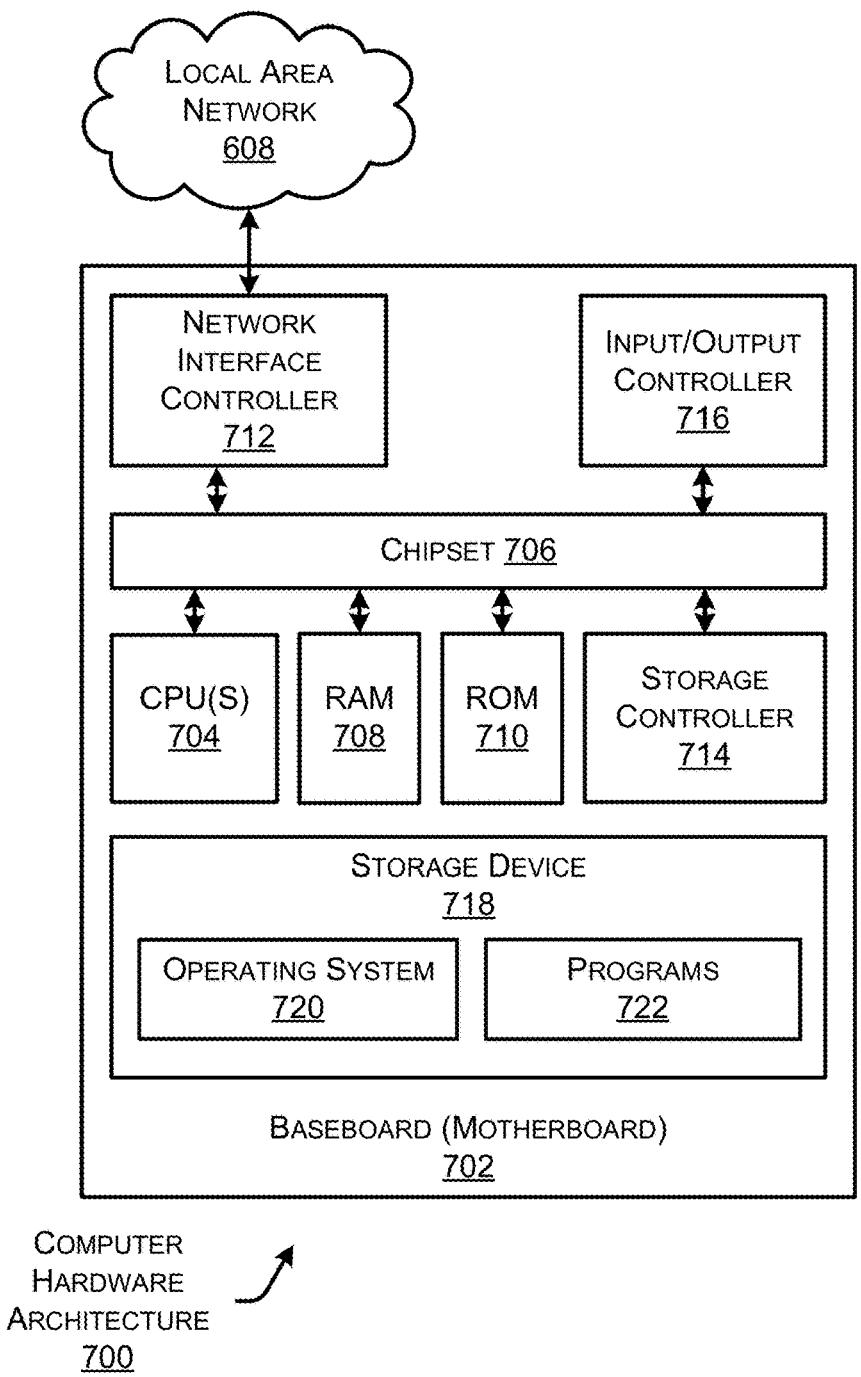
FIG. 7 illustrates a computer architecture diagram showing an example computer hardware architecture for implementing a computing device that may be utilized to implement aspects of the various technologies presented herein.

FIG. 7 illustrates a computer architecture diagram showing an example computer hardware architecture 700 for implementing a computing device that may be utilized to implement aspects of the various technologies presented herein. The computer hardware architecture 700 shown in FIG. 7 illustrates the orchestrator 112, the management system 114, the fabric controllers 116, the edge devices 124, and/or other systems or devices associated with the overlay network and/or remote from the overlay network, a workstation, a desktop computer, a laptop, a tablet, a network appliance, an e-reader, a smartphone, or other computing device, and may be utilized to execute any of the software components described herein. The computer 700 may, in some examples, correspond to a network device (e.g., orchestrator 112, the management system 114, the fabric controllers 116, and/or the edge devices 124 (and associated devices) described herein, and may include networked devices such as servers, switches, routers, hubs, bridges, gateways, modems, repeaters, access points, etc.

The computer 700 includes a baseboard 702, or "motherboard," which is a printed circuit board to which a multitude of components or devices may be connected by way of a system bus or other electrical communication paths. In one illustrative configuration, one or more central processing units (CPUs) 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the computer 700. The chipset 706 may further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM may also store other software components necessary for the operation of the computer 700 in accordance with the configurations described herein.

The computer 700 may operate in a networked environment using logical connections to remote computing devices and computer systems through a network, such as the orchestrator 112, the management system 114, the fabric controllers 116, the edge devices 124, among other devices. The chipset 706 may include functionality for providing network connectivity through a Network Interface Controller (NIC) 712, such as a gigabit Ethernet adapter. The NIC 712 is capable of connecting the computer 700 to other computing devices within the overlay network and external to the overlay network. It may be appreciated that multiple NICs 712 may be present in the computer 700, connecting the computer to other types of networks and remote computer systems. In some examples, the NIC 712 may be configured to perform at least some of the techniques described herein, such as packet redirects and/or other techniques described herein.

The computer 700 may be connected to a storage device 718 that provides non-volatile storage for the computer. The storage device 718 may store an operating system 720, programs 722 (e.g., any computer-readable and/or computer-executable code described herein), and data, which have been described in greater detail herein. The storage device 718 may be connected to the computer 700 through a storage controller 714 connected to the chipset 706. The storage device 718 may consist of one or more physical storage units. The storage controller 714 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 700 may store data on the storage device 718 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 718 is characterized as primary or secondary storage, and the like.

For example, the computer 700 may store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the storage device 718 by detecting the physical states or characteristics of one or more particular locations within the physical storage units.

In addition to the storage device 718 described above, the computer 700 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 700. In some examples, the operations performed by the orchestrator 112, the management system 114, the fabric controllers 116, the edge devices 124, and/or any components included therein, may be supported by one or more devices similar to computer 700. Stated otherwise, some or all of the operations performed by the orchestrator 112, the management system 114, the fabric controllers 116, the edge devices 124, and/or any components included therein, may be performed by one or more computer devices operating in a cloud-based arrangement.

By way of example, and not limitation, computer-readable storage media may include volatile and non-volatile, removable, and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 718 may store an operating system 720 utilized to control the operation of the computer 700. According to one example, the operating system 720 includes the LINUX operating system. According to another example, the operating system includes the WINDOWS® SERVER operating system from MICROSOFT Corporation of Redmond, Washington. According to further examples, the operating system may include the UNIX operating system or one of its variants. It may be appreciated that other operating systems may also be utilized. The storage device 718 may store other system or application programs and data utilized by the computer 700.

In one example, the storage device 718 or other computer-readable storage media is encoded with computer-executable instructions which, when loaded into the computer 700, transform the computer from a general-purpose computing system into a special-purpose computer capable of implementing the examples described herein. These computer-executable instructions transform the computer 700 by specifying how the CPUs 704 transition between states, as described above. According to one example, the computer 700 has access to computer-readable storage media storing computer-executable instructions which, when executed by the computer 700, perform the various processes described above with regard to FIGS. 1 through 6. The computer 700 may also include computer-readable storage media having instructions stored thereupon for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, an input/output controller 716 may provide output to a display, such as a computer monitor, a flat-panel display, a digital projector, a printer, or other type of output device. It will be appreciated that the computer 700 might not include all of the components shown in FIG. 7, may include other components that are not explicitly shown in FIG. 7, or might utilize an architecture completely different than that shown in FIG. 7.

As described herein, the computer 700 may include one or more of the orchestrator 112, the management system 114, the fabric controllers 116, the edge devices 124, and/or other systems or devices associated with the overlay network and/or remote from the overlay network. The computer 700 may include one or more hardware processor(s) such as the CPUs 704 configured to execute one or more stored instructions. The CPUs 704 may include one or more cores.

Further, the computer 700 may include one or more network interfaces configured to provide communications between the computer 700 and other devices, such as the communications described herein as being performed by the orchestrator 112, the management system 114, the fabric controllers 116, the edge devices 124, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 722 may include any type of programs or processes to perform the techniques described in this disclosure for the orchestrator 112, the management system 114, the fabric controllers 116, and the edge devices 124 as described herein. The programs 722 may enable the devices described herein to perform various operations.

CONCLUSION

The examples described herein provide systems and methods for quadrupling of the scale-number of DTLS sessions that may be concurrently supported at the orchestrator device that may have otherwise been able to support approximately 1,500 DTLS sessions. Further, the examples described herein allow the number of concurrent DTLS sessions within the overlay network to be quadrupled without code changes being done at other controllers or the on-boarding edge devices that are on-premises in nature. Any application that utilizes reverse proxy termination and forwarding may use the present systems and methods. Instead of using a dedicated reverse proxy, the functionality is implemented into the DPDK directly. The originating applications such as fabric controllers and/or management systems 114 may remain agnostic of the number of instances at the orchestrator that may terminate the sessions. Further, the low overhead IPC model allows a single point pivot to function as a master or relay agent and saves on the number of point to point IPC endpoints. Still further, by divvying up the transactions into spaces to associate the different daemon instances of origin, there is no need to upgrade or change the code at the controllers or management systems, and the controllers or management systems remain agnostic of the number of instances at the orchestrator.

Utilizing the above-described systems and methods provides for an effective and efficient distribution DTLS session across different daemon instances since it includes a hash-based solution implemented in the DPDK. Further, the present systems and methods provide for minimal code and/or enhancement effort to the orchestrator, the management system, the fabric controllers, the edge devices, and other network devices deployed in the network. Further, the present systems and methods provide for live add or live removal of processors and other computing resources. Still further, through the use of present systems and methods, the number of DTLS sessions that may be concurrently supported at the orchestrator may be easily scaled to allow the number to be quadrupled without code changes being done at the orchestrator, the management system, or the fabric controllers or the on-boarding edge platforms.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method of creating a connection between a controller and edge devices, comprising:

receiving packets at a common destination port of the controller and from the edge devices, wherein the controller is configured to forward individual ones of the packets to listening ports of the controller based at least in part on the packets being received on the common destination port:

assigning a first unique identifier to first packets of the packets received on the common destination port, the first unique identifier indicating a first listening port on which a first process is listening;

assigning a second unique identifier to second packets of the packets received on the common destination port, the second unique identifier indicating a second listening port on which a second process is listening;

appending the first unique identifier to at least one of the first packets;

appending the second unique identifier to at least one of the second packets; and subsequent to the appending, sending the first packets and the second packets to a network kernel, wherein the network kernel is configured to send the first packets to the first listening port and the second packets to the second listening port.

2. The method of claim 1, wherein the first packets are assigned to the first process and the second packets are assigned to the second process from a group of processes based at least in part on the first process and the second process listening on the listening ports.

3. The method of claim 1, wherein the assigning is performed by a data plane development kit (DPDK), the DPDK existing in a user space of the controller.

4. The method of claim 1, wherein assigning the first unique identifier to the first packets and the second unique identifier to the second packets comprises:

determining a first hash, the first hash being computed using a first source IP and a first source port <SRC IP, SRC PORT> of a first edge device of the edge devices from which the packets were sent the first hash including an offset; and determining a second hash, the second hash being computed using a second source IP and a second source port <SRC IP, SRC PORT> of a second edge device of the edge devices from which the packets were sent, the second hash including the offset.

5. The method of claim 1, further comprising:

terminating, via the first process, a session associated with the first packets;

transmitting a learning (LRN) peer event notification to the second process acting as a master process; and transmitting, via the second process, the LRN peer event notification to at least a third process to synchronize state information between the first process, the second process, and the third process.

6. The method of claim 1, further comprising:
receiving a first register request from a first edge device of the edge devices at the first process;
creating, at the first edge device, a transaction identification (ID) within a second register request, the transaction ID being generated within a space of the first process;
transmitting the second register request to the second process;
forwarding, by the second process, the second register request over a hosted session with a network management system;
signing, with the network management system, a certificate associated with the second register request based on the transaction ID;
transmitting second register request including a signed certificate to the second process;
at the second process, looking up the transaction ID of the second register request in a transaction ID database local to the second process;
forwarding the second register request to the first process based on a determination that the transaction ID of the second register request is not found in the transaction ID database local to the second process; and
at the first process, transmitting the signed certificate in a register reply to the first edge device based on the transaction ID.

7. A non-transitory computer-readable medium storing instructions that, when executed, causes a processor to perform operations, comprising:
receiving packets at a common destination port of a controller and from edge devices, wherein the controller is configured to forward individual ones of the packets to listening ports of the controller based at least in part on the packets being received on the common destination port;
assigning a first unique identifier to first packets of the packets received on the common destination port, the first unique identifier indicating a first listening port on which a first process is listening;
assigning a second unique identifier to second packets of the packets received on the common destination port, the second unique identifier indicating a second listening port on which a second process is listening;
appending the first unique identifier to at least one of the first packets;
appending the second unique identifier to at least one of the second packets; and
subsequent to the appending, sending the first packets and the second packets to a network kernel, wherein the network kernel is configured to send the first packets to the first listening port and the second packets to the second listening port.

8. The non-transitory computer-readable medium of claim 7, wherein the first packets are assigned to the first process and the second packets are assigned to the second process from a group of processes based at least in part on the first process and the second process listening on the listening ports.

9. The non-transitory computer-readable medium of claim 7, wherein the assigning is performed by a data plane development kit (DPDK), the DPDK existing in a user space of the controller.

10. The non-transitory computer-readable medium of claim 7, wherein assigning the first unique identifier to the first packets and the second unique identifier to the second packets comprises:

determining a first hash, the first hash being computed using a first source IP and a first source port <SRC IP, SRC PORT> of a first edge device of the edge devices from which the packets were sent the first hash including an offset; and
determining a second hash, the second hash being computed using a second source IP and a second source port <SRC IP, SRC PORT> of a second edge device of the edge devices from which the packets were sent, the second hash including the offset.

11. A system comprising:
a processor; and
a non-transitory computer-readable media storing instructions that, when executed by the processor, causes the processor to perform operations comprising:
receiving packets at a common destination port of a controller and from edge devices, wherein the controller is configured to forward individual ones of the packets to listening ports of the controller based at least in part on the packets being received on the common destination port;
assigning a first unique identifier to first packets of the packets received on the common destination port, the first unique identifier indicating a first listening port on which a first process is listening;
assigning a second unique identifier to second packets of the packets received on the common destination port, the second unique identifier indicating a second listening port on which a second process is listening;
appending the first unique identifier to at least one of the first packets;
appending the second unique identifier to at least one of the second packets; and
subsequent to the appending, sending the first packets and the second packets to a network kernel, wherein the network kernel is configured to send the first packets to the first listening port and the second packets to the second listening port.

12. The system of claim 11, wherein the first packets are assigned to the first process and the second packets are assigned to the second process from a group of processes based at least in part on the first process and the second process listening on the listening ports.

13. The system of claim 11, wherein assigning the first unique identifier to the first packets and the second unique identifier to the second packets comprises:
determining a first hash, the first hash being computed using a first source IP and a first source port <SRC IP, SRC PORT> of a first edge device of the edge devices from which the packets were sent the first hash including an offset; and
determining a second hash, the second hash being computed using a second source IP and a second source port <SRC IP, SRC PORT> of a second edge device of the edge devices from which the packets were sent, the second hash including the offset.

14. The method of claim 1, wherein the first unique identifier indicates a first port address associated with the first listening port and the second unique identifier indicates a second port address associated with the second listening port.

15. The method of claim 14, wherein appending the first unique identifier and the second unique identifier comprises:
replacing a common destination port address with the first port address for the first packets; and
replacing the common destination port address with the second port address for the second packets.

16. The method of claim 1, further comprising:
receiving the first packets as first returning packets at a common source port of the controller and from the first process, the first returning packets being associated with a first source port address of the first listening port;
receiving the second packets as second returning packets at the common source port of the controller and from the second process, the second returning packets being associated with a second source port address of the second listening port; and
replacing the first source port address and the second source port address with a common source port address of the common source port.

17. The non-transitory computer-readable medium of claim 7, wherein the first unique identifier indicates a first port address associated with the first listening port and the second unique identifier indicates a second port address associated with the second listening port.

18. The non-transitory computer-readable medium of claim 17, wherein appending the first unique identifier and the second unique identifier comprises:
replacing a common destination port address with the first port address for the first packets; and
replacing the common destination port address with the second port address for the second packets.

19. The non-transitory computer-readable medium of claim 7, the operations further comprising:
receiving the first packets as first returning packets at a common source port of the controller and from the first process, the first returning packets being associated with a first source port address of the first listening port;
receiving the second packets as second returning packets at the common source port of the controller and from the second process, the second returning packets being associated with a second source port address of the second listening port; and
replacing the first source port address and the second source port address with a common source port address of the common source port.

20. The system of claim 11, the operations further comprising:
receiving the first packets as first returning packets at a common source port of the controller and from the first process, the first returning packets being associated with a first source port address of the first listening port;
receiving the second packets as second returning packets at the common source port of the controller and from the second process, the second returning packets being associated with a second source port address of the second listening port; and
replacing the first source port address and the second source port address with a common source port address of the common source port.

* * * * *